Figure 1:
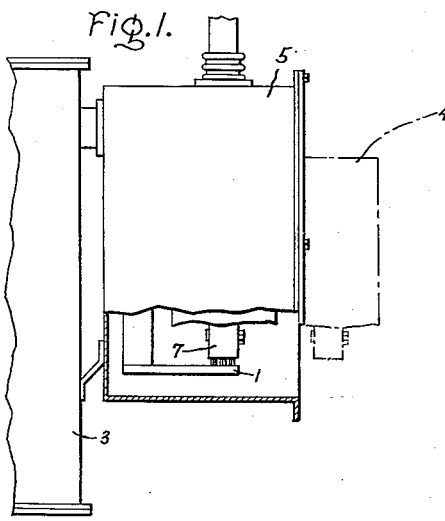

Oct. 16, 1951  W. W. TURNER  2,571,794
CONNECTING SWITCH DEVICE
Filed Dec. 14, 1949

Inventor:
William W. Turner,
by Ernest C. Britton
His Attorney.

Patented Oct. 16, 1951

2,571,794

UNITED STATES PATENT OFFICE 2,571,794

CONNECTING SWITCH DEVICE

William W. Turner, Drexel Hill, Pa., assignor to General Electric Company, a corporation of New York Application December 14, 1949, Serial No. 132,872

4 Claims. (Cl. 200—153)

My invention relates to connecting devices for conducting electric currents and, more particularly, to such devices which are readily operable to make and break a current conducting connection between two spaced conductors.

The principal object of my invention is to provide an easily and quickly operable connecting device which has a relatively simple and economical structure requiring a minimum of space and which provides a maximum of conductivity even under heavy currents. This and other objects of my invention will hereinafter appear in more detail.

In the so-called "low voltage" alternating current networks or distribution systems, it is customary to use devices known as network protectors. These embody a circuit interrupting unit, such as a circuit breaker, which is connected in the lines between the network and the low voltage side of a transformer, the high voltage winding of which is connected in the high voltage feeder. The circuit breaker functions to open the lines to the network load under predetermined conditions.

The protector unit is enclosed in a case adjacent the transformer bus bar and is connected to the network by fuses which are incorporated in the system for backup protection in case the circuit breaker fails to clear a fault originating outside the network.

Although the unit is readily disconnected from the network by removing the fuses it previously had to be disconnected from the transformer bus bar by bolt and nut connections. As this type of equipment usually is located in subterranean chambers which are liable to be flooded, the breaking of the bus bar connections was often difficult and time consuming.

In accordance with my invention, I provide a simple readily operable connecting means to be inserted in the lines connecting the low voltage side of the distribution transformer and protector, and which may be safely operated to disconnect the circuit protector from the transformer even though certain parts of the protector remain energized. Since these network protectors are usually installed in locations where space is a controlling factor, the connecting means of my invention is constructed to occupy a minimum of space while providing ample current conducting capacity even under overload conditions and without reduction of such capacity in consequence of any magnetic effects attendant upon such heavy currents. Further, in accordance with my invention, the connecting means provided is so constructed that when it is in disconnect position the whole protector unit may be withdrawn from and returned to its enclosing case while repairs are being made or in the event that adjustments or repairs are too extensive to make in the field, to allow a ready substitution of another protector unit.

My invention includes a shaft member comprising a pair of coaxial stub shafts rotatably supported between one pair of opposite walls of a hollow rectangular conductor connected to a circuit interrupter and mounted in spaced relation with the low voltage bus bar of a transformer. The stub shafts support a pair of cranks between which a cross-head is rotatably mounted. A plurality of rods positioned parallel to the supporting walls extend through the crosshead and are slidable therein. Each of the rods is provided with a stop at one end thereof and a bifurcated member secured to the other end thereof. A common pin rotatable in the bifurcated members is extended at both ends to be slidable in guide slots in the supporting walls. The guide slots are disposed in the direction of the longitudinal axis of the rectangular conductor.

Pairs of arms are pivotally mounted upon the common pin between the tines of the bifurcated members, to form toggle joints. The outer ends of the arms pivotally support pairs of roller contacts. Springs positioned around the rods extend and are constrained between the crosshead and the bifurcated members to furnish resilient compression members between the crosshead and the members.

Contact between the rollers and the bus bar is made and broken by rotation of the shaft member so that when the shaft member is turned to the disconnect position the rollers are drawn within the conductor. When rotation of the shaft member is reversed, the rollers are first moved into contact with the bus bar, and upon further rotation of the shaft member, the crosshead presses the springs and toggle action forces the rollers to separate and simultaneously to contact the bus bar and the second pair of opposite walls of the conductor.

Figure 2:
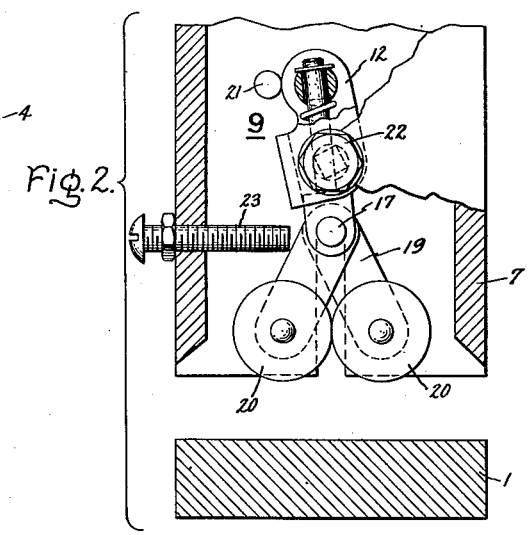
Figure 3:
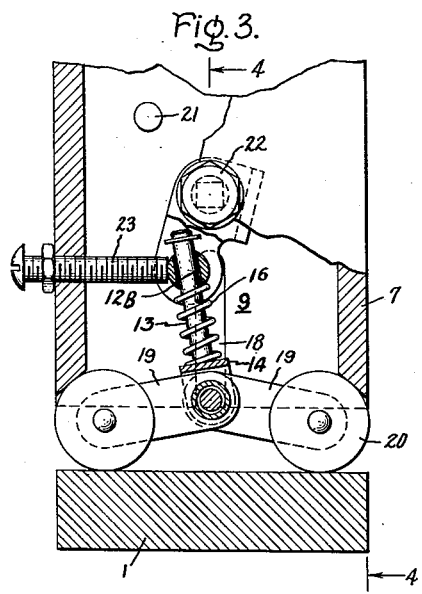
Figure 4:
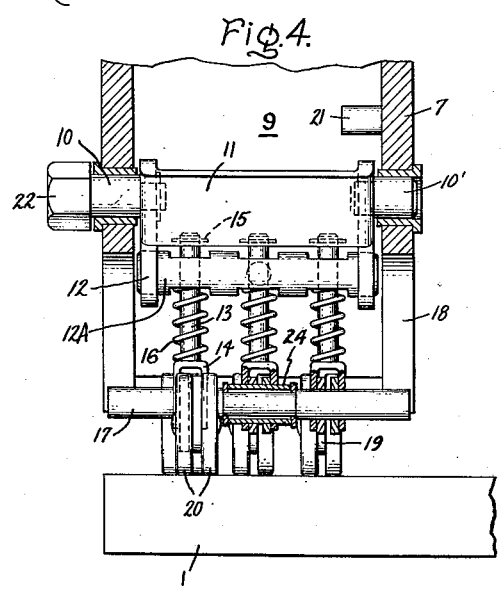
Figure 5:
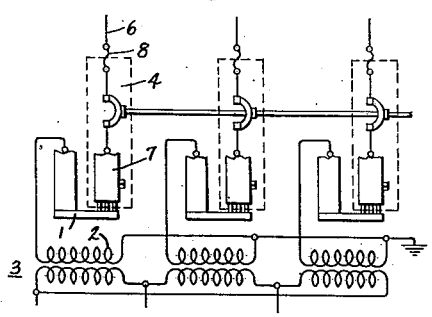

For a better understanding of my invention, reference is made to the accompanying drawing in which Fig. 1 is a view of the low voltage side of the supply transformer connected through a network protector to the network; Fig. 2 is a cutaway end view in the disconnect position of the embodiment of my invention shown in Fig. 1; Fig. 3 is a cutaway end view of the apparatus completing a connection between the network protector and the low voltage terminal of the supply transformer; Fig. 4 is a view of section 4—4 looking in the direction of the arrows; Fig. 5 is a circuit diagram of the application of the apparatus to an alternating current network.

Referring to the drawing, a bus bar 1 is connected to the low voltage windings 2 of a supply transformer 3. A circuit protector 4, slidably mounted in a case 5, connects bus bar 1 to network connections 6 through conductors 7 and fuses 8. Conductor 7 has a hollow rectangular cross section in which is mounted a connecting device 9 to complete electrical connection between conductor 7 and bus bar 1.

Within hollow conductor 7 a pair of stub shafts 10 and 10' are rotatably journaled in opposite supporting walls of conductor 7 to form a shaft member and are connected by a reinforcing member 11. Corresponding ends of a pair of cranks 12 are mounted upon shafts 10 and 10'. A cross-head 12A is rotatably mounted between the opposite ends of cranks 12.

The cross-head is provided with a plurality of cylindrical apertures 12B in which rods 13 are mounted for axial sliding movement. Each rod is provided with a bifurcated member 14 at one end and a stop 15 at the opposite end. A compression spring 16 surrounds each rod and extends between the adjacent surfaces of cross-head 12A and bifurcated member 14 to provide a resilient compression member therebetween. A pin 17 is commonly rotatable in the tines of the bifurcated members 14 and extends into slot guides in the supporting walls of conductor 7. Corresponding ends of pairs of arms 19 are pivoted upon pin 17 between the tines of bifurcated members 14. Each pair of arms 19 forming toggle joints together with its associated member 14 and spring 16 constitutes a resilient toggle joint mechanism. Pairs of rollers 20 are pivoted at the opposite end of each arm 19.

In the disconnect position of device 9 shown in Fig. 2 one of the cranks 12 rests against a stop 21 in one of the remaining pair of walls of conductor 7 with arms 19 suspended from pin 17 and the rollers out of engagement with bus bar 1 and conductor 7. In this position the contact ends of the pairs of arms 19 are maintained apart by the tangential meeting of rollers 20. Stub shaft 10 extends through one of the supporting walls and the projecting end is provided with a hexagonal head 22 for rotation of shaft 10 by means of a wrench. When bus bar 1 is energized shaft 10 is rotated by use of an insulated wrench. As hexagonal head 22 as shown in Fig. 2, is rotated clockwise the rollers 20 contact bus bar 1. Upon continued rotation of the shaft member, pressure of cross-head 12A against springs 16 forces contacts 20 to separate and roll on bus bar 1 to contact simultaneously bus bar 1 and the walls of conductor 7. An additional small angle rotation of the shaft member carries the joint between cranks 12 and rod 13 beyond the dead center position thereof until crosshead 12A contacts an adjustable stop 23 projecting from one of the supporting walls of conductor 7 where it is held by action of spring 16, as shown in Fig 5, locking contacts 20 in position against conductors 1 and 7. The contact pressure between the surface of roller 20 and the surfaces of conductor 7 and bus bar 1 is constant depending upon the resilience of spring 16 and upon the setting of stop 23, unlike the contact pressure of the formerly used bolted connection which is variable depending upon the force employed in tightening the bolt.

A lost motion device is included in the intermediate toggle joint to insure that all of the intermediate rollers 20 are seated firmly between bus bar 1 and the remaining pair of walls of conductor 7. Portions of pin 17 corresponding to bifurcated members 14 are undercut and sleeves 24 are positioned to be loosely rotatable thereon between pin 17 and bifurcated members 14. Corresponding arms 19 are rotatably mounted upon sleeves 24. Sleeves 24 allow intermediate spring 16 to toggle the intermediate rollers into position between bus bar 1 and conductor 7, independently of the end rollers and without further motion of pin 17.

While certain specific embodiments have been shown and described, it will, of course, be understood that various modifications may be made without departing from the invention. The appended claims are, therefore, intended to cover any such modifications within the true spirit and scope of my invention.

What I claim as new and desire to secure by Letters Patent of the United States is:

1. Means for making and breaking a current conducting connection between two spaced conductors one of said conductors being of hollow rectangular cross-section comprising roller contacts and supporting means for said contacts rotatively mounted within said hollow conductor, said supporting means including means for causing transverse movement of said contacts relative to said one conductor and means for causing translatory movement towards the other of said conductors.

2. Means for making and breaking a current conducting connection between two spaced conductors, one of said conductors being of hollow rectangular cross-section comprising roller contacts and supporting means for said contacts rotatively mounted within said hollow conductor, said supporting means including means for causing movement of said contacts towards the other of said conductors and provided with a pivotable cross-head having a plurality of cylindrical apertures arranged in line therein, rods slidably mounted in said apertures, said rods having stops and bifurcated members correspondingly mounted upon opposite ends thereof, a pin pivotally mounted in said bifurcated members and pairs of arms pivoted at corresponding ends upon said pin between the tines of said bifurcated members, pairs of said rollers being pivotally mounted upon the opposite ends of said arms and means for transverse movement of said contacts relative to said rectangular conductor comprising springs surrounding said rods and extending between adjacent surfaces of said cross-head and said bifurcated members to form with said arms resilient toggle mechanisms so that when said rollers are in contact with said other conductor, pressure upon said springs by said cross-head causes said contacts to roll apart on said other conductor to contact said other conductor and sides of said rectangular conductor simultaneously.

3. A device for making and breaking a current conducting connection between two spaced conductors, one of said conductors being of hollow rectangular cross-section and the other of said conductors being a bus bar, said device including supporting means pivotally mounted between a pair of opposite supporting walls of said rectangular conductor and provided with a pivotable cross-head having a plurality of cylindyrical apertures arranged in line therein, said means being adapted to provide motion to said cross-head towards and away from said bus bar, rods slidably mounted in said apertures and having stops and bifurcated members correspondingly mounted upon opposite ends thereof, said opposite supporting walls having guide slots therein disposed in the direction of said rectilinear motion, a pin pivotally mounted in said bifurcated members and extended at each end within said guide slots, pairs of arms pivoted at corresponding ends around said pin between the tines of said bifurcated members, pairs of roller contacts pivotally mounted upon the opposite ends of said arms, so that upon movement of said cross-head away from said bus bar said contacts are drawn into said rectangular conductor out of contact with said bus bar, and springs surrounding said rods and extending between adjacent surfaces of said cross-head and said bifurcated members to form a resilient toggle joint mechanism with said arms, so that upon movement of said cross-head towards said bus bar after said rollers contact said bus bar, toggle action forces said rollers to roll apart upon said bus bar simultaneously to contact said bus bar and the other pair of opposite walls of said rectangular conductor.

4. A device for making and breaking a current conducting connection between two spaced conductors, one of said conductors being of hollow rectangular cross-section and the other of said conductors being a bus bar, comprising a pair of concentric cranks pivotally mounted upon a pair of opposite supporting walls of said hollow conductor, a cross-head pivotally mounted between said cranks and provided with a plurality of cylindrical apertures arranged in line therein, rods slidably mounted in said apertures, a bifurcated member mounted upon one end of each of said rods and a stop mounted upon the opposite end thereof, springs surrounding said rods and extending between adjacent surfaces of said cross-head and said bifurcated members to provide resilient compression members therebetween, said supporting pair of opposite walls being provided with guide slots disposed in the direction of the longitudinal axis thereof, a pin rotatably mounted in said bifurcated members and extending into said guide slots, pairs of arms adjacent rotatably mounted at corresponding ends thereof around said pin between the tines of said bifurcated members to form toggle joints, pairs of roller contacts pivoted upon the opposite ends of said arms and in mutual tangential relation so that at least a minimum angle is maintained between said arms when said arms are out of contact with said bus bar, said cranks being selectively rotatable in one direction to move said rollers out of contact with said bus bar, and rotatable in the opposite direction to move said rollers into contact with said bus bar and further rotatable in said opposite direction to cause said rollers to roll apart along said bus bar to complete contact between said bus bar and the remaining pair of opposite walls of said rectangular conductor, an adjustable stop mounted upon one of said remaining pair of walls, said cranks being still further rotatable in said opposite direction until the joint between said cranks and said rods passes the dead center thereof with said cross-head against said stop to lock said rollers in contact relation with said walls and said bus bar and a lost motion device mounted between the intermediate of said bifurcated members and said pin to allow the rollers corresponding thereto to complete contact between said other pair of walls and said bus bar without further movement of said pin.

WILLIAM W. TURNER.

REFERENCES CITED

The following references are of record in the file of this patent:

UNITED STATES PATENTS

| Number | Name | Date |
| --- | --- | --- |
| 1,611,593 | Kapitza | Dec. 21, 1926 |
| 1,893,046 | Austin | Jan. 3, 1933 |